UNITED STATES PATENT OFFICE.

AUGUST E. NIENSTADT, OF NEWARK, NEW JERSEY.

VARNISHING COMPOSITION AND PROCESS OF MAKING SAME.

No. 831,736.　　　　Specification of Letters Patent.　　　Patented Sept. 25, 1906.

Application filed December 9, 1905. Serial No. 291,076.

*To all whom it may concern:*

Be it known that I, AUGUST E. NIENSTADT, a citizen of the United States of America, and a resident of Newark, county of Essex, State of New Jersey, have invented certain new and useful Improvements in Varnishing Compositions and Process of Making Same, of which the following is a specification.

This invention has reference to novel compositions of matter, and pertains particularly to novel varnishing compositions and the process of making same.

It is the special object of this invention to provide a novel varnish which is a colorless, transparent, easily mobile, and very adhesive liquid. This novel varnish resembles the so-called "celluloid" varnish and is used for similar purposes. Owing to its colorlessness and transparency the novel varnish is particularly well adapted for use with delicate light-shaded colors and pigments, and especially for suspending bronze powders therein. When spread out in thin layers by means of a brush or otherwise, then this varnish dries and gets hard quickly. The transparency and quick drying of this varnish make same superior to similar varnishes and render it adapted for many applications. The varnish does not contain any easily-ignitible components, as celluloid varnish, for instance, which even contains such after drying.

The invention further consists in the production of other varnishing compositions which are heavier, and novel compositions of matter may be made in accordance with this invention which do not dry at all, as will be fully explained farther down.

All my novel compositions of matter contain as an essential component gum-pontianac. In order to render the gum-pontianac soluble and for the purpose of obtaining fine clear products, the gum-pontianac must be most carefully prepared. In its native state pontianac-gum, or "gutta-jeutong," as it is also called, represents a big white cheese-like substance. It is the partially-dried milky juice of a tree, and therefore of organic origin. In commerce it is found in large cakes. The gum has a very disagreeable and pungent odor, resembling the odor of bad cheese, and shows an acid reaction. In rendering the gum-pontianac adapted for the various compositions it is first brought into a soft and pliable condition by submerging it in hot water. The softened gum is then transformed into thin paper-like strips with irregularly-applied openings or perforations. These strips resemble irregularly-made lace in appearance. The strips thus obtained are now immersed in cold water to which some ammonia has been added. In this bath of a weak and cold ammonia solution the strips become deodorized, and at the same time the acid compounds are neutralized by combining with the ammonia. The strips are now washed in pure water and then dried. Care must be taken that all traces of moisture have been removed. When completely dried, the thin strips will easily dissolve in a number of solvents.

It is not advisable to cut up the original mass of gum into small lumps or reduce it otherwise to small pieces, because these lumps cannot be easily freed from acid compounds and will not dry well. The thin paper-like strips with irregular perforations, however, are easily freed from acid compounds and dry quickly and completely. The strips thus prepared will easily and quickly dissolve in light liquid hydrocarbons of both the fatty and aromatic series. The gum may, for instance, be dissolved in benzin, gasolene, or spirits of turpentine, benzene, bisulfid of carbon, and other suitable solvents. When the gum has been dissolved, it is advisable to allow the dissolution to rest, because usually a sediment will gradually settle at the bottom. The resulting clear liquid may be decanted when prepared in small vessels or drawn off when made in large tanks. If desired, the dissolution may be filtered.

The varnishing compositions thus prepared appear as clear, colorless, almost water-like liquids. They may be used as such like celluloid varnish, or light-colored delicate pigments may be mixed therewith, and, as above stated, these varnishes are particularly well adapted to suspend therein fine bronzes.

The irregularly-perforated strip of gum-pontianac as above prepared will also dissolve in the heavier grades of the Pennsylvania oils, as well as in vegetable and animal oils. The strips may, for instance, be dissolved in linseed-oil, which is a drying oil, and used as a varnish. To this may be added white lead and other pigments.

When the strips are dissolved in the heavier grades of Pennsylvania oils and mixed with vaseline, then the resulting product is non-drying and forms an excellent leather dressing.

In the described manner I have produced novel compositions of matter, particularly varnish compositions, by a new process, which compositions may be used in various arts and trades.

Having thus described my invention, I claim as new and desire to secure by Letters Patent—

1. The process of producing novel compositions of matter consisting in deodorizing pontianac-gum and freeing it from acid compounds by alkaline solutions, washing the gum with cold water to remove the excess of alkali, then drying it, and finally dissolving it in suitable solvents.

2. The process of producing colorless and transparent varnishing compositions consisting in deodorizing gum-pontianac and freeing it from acid compounds by dilute ammonia, washing the gum in cold water to remove any excess of ammonia, then drying it, and finally dissolving it in liquid hydrocarbons.

3. The process of producing clear colorless varnishing compositions consisting in transforming gum-pontianac into thin, paper-like and irregularly-perforated strips, deodorizing said strip, and freeing them from acid compounds, then drying the strips, and dissolving them in suitable solvents.

4. The process of producing clear colorless varnishing compositions consisting in transforming gum-pontianac into thin irregularly-perforated strips, deodorizing said strips and freeing them from acid compounds by dilute ammonia, washing the strips in cold water to remove any excess of ammonia, drying the strips and dissolving them in light liquid hydrocarbons.

5. As novel compositions of matter varnishes existing in form of clear, colorless liquids and composed essentially of gum-pontianac and suitable solvents.

6. As novel composition of matter varnishes existing in form of clear, colorless liquids and composed essentially of gum-pontianac deodorized and freed from acids, and of light hydrocarbons.

Signed at New York, N. Y., this 7th day of December, 1905.

AUGUST E. NIENSTADT.

Witnesses:
LUDWIG K. BÖHM,
JAMES J. ASTARITA.